US007689527B2

(12) United States Patent
Pavlov et al.

(10) Patent No.: US 7,689,527 B2
(45) Date of Patent: Mar. 30, 2010

(54) ATTRIBUTE EXTRACTION USING LIMITED TRAINING DATA

(75) Inventors: Dmitri Y. Pavlov, San Jose, CA (US); Ramnath Balasubramanyan, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 473 days.

(21) Appl. No.: 11/731,136

(22) Filed: Mar. 30, 2007

(65) Prior Publication Data

US 2008/0243905 A1    Oct. 2, 2008

(51) Int. Cl.
*G06F 17/00*     (2006.01)
*G06N 5/00*      (2006.01)

(52) U.S. Cl. ....................................................... 706/45
(58) Field of Classification Search ..................... 706/45
See application file for complete search history.

(56) References Cited

U.S. PATENT DOCUMENTS

| 5,864,860 | A  | * | 1/1999  | Holmes ........................ 707/101 |
| 7,383,254 | B2 | * | 6/2008  | Wen et al. .......................... 707/3 |
| 2004/0073874 | A1 | * | 4/2004 | Poibeau et al. ............... 715/531 |
| 2006/0116862 | A1 | * | 6/2006 | Carrier et al. ................... 704/1 |
| 2006/0190684 | A1 | * | 8/2006 | McCammon et al. ....... 711/117 |
| 2006/0235875 | A1 | * | 10/2006 | Wen et al. ................. 707/103 Y |
| 2007/0282892 | A1 | * | 12/2007 | Probst et al. ................. 707/102 |

OTHER PUBLICATIONS

John Lafferty et al., "Conditional Random Fields: Probabilistic Models for Segmenting and Labeling Sequence Data", International Conference on Machine Learning 2001.*
Hanna M. Wallach, "Conditional Random Fields: An Introduction", University of Pennsylvania CIS Technical Report MS-CIS-04-21.*
"Overview" downloaded from the Internet on Apr. 7, 2008 < http://www.sightup.com/en/technologies_presentation.html > 1 page.
"Taggis—Attribute extraction Engine for attribute search" downloaded from the Internet on Apr. 7, 2008 < http://www.sightup.com/en/produits_taggis.html > 2 pages.

* cited by examiner

*Primary Examiner*—David R Vincent
*Assistant Examiner*—Vincent M Gonzales
(74) *Attorney, Agent, or Firm*—Hickman Palermo Truong & Becker LLP

(57) ABSTRACT

Techniques are described for reducing the false positive rate of regular expression attribute extractions via a specific data representation and a machine learning method that can be trained at a much lower cost (much fewer labeled examples) than would be required by a full scale machine learning solution. Attribute determinations made using the regular expression technique are represented as skeleton tokens. The skeleton tokens, along with accurate attribute determinations, are provided to a machine-learning mechanism to train the machine-learning mechanism. Once trained, the machine-learning mechanism is used to predict the accuracy of attribute determinations represented by skeleton tokens generated for not-yet-analyzed input text.

20 Claims, 3 Drawing Sheets

ATTRIBUTE EXTRACTION USING LIMITED TRAINING DATA

FIELD OF THE INVENTION

The present invention relates to attribute extraction and, more specifically, to automated attribute extraction.

BACKGROUND

The approaches described in this section are approaches that could be pursued, are but not necessarily approaches that have been previously conceived or pursued. Therefore, unless otherwise indicated, it should not be assumed that any of the approaches described in this section qualify as prior art merely by virtue of their inclusion in this section.

"Attribute extraction" refers to determining specific pieces of information from text, where those specific pieces of information are not explicitly tagged as such within the text. For the purpose of explanation, the text from which attributes are to be extracted is referred to herein as "input text". The input text for an attribute extraction may be from any source. For example, in the context of an online shopping service, the input text may be product offerings. Some product offerings may be provided to the shopping service by merchants, and some product offerings may be obtained by crawling the websites of merchants.

Attribute extraction may involve, for example, determining the brand, size and color of a product from the text of an advertisement for the product. As another example, attribute extraction may involve determining the title, page length and author of a book based on a text description of the book. These are merely two examples of contexts in which attribute extraction may be useful. The techniques described herein are not limited to any particular attribute extraction context.

In many contexts, it is critical that attribute extraction yield accurate results. For example, it is very important for companies that distribute merchants' content on the Internet to accurately extract attributes of that content to allow customers to perform attribute-based searches for the products they desire. In one shopping system, for example, the offers from invoiced merchants are first categorized into a taxonomy of classes (e.g. Apparel, Jewelry, Home and Garden and deeper) and then are subjected to the category-dependent attribute extraction. For instance, offers falling into Apparel class may require attributes like BRAND, MODEL NUMBER, AGE, GENDER, SIZE extracted from them. These attributes are then used in many tasks, including matching of offers to catalogues by matching on the values of the key attributes. The attribute values may also be exposed to the users on a live site, to enable guided navigation browsing.

Extracted attributes may be "embedded" or "derived". Embedded attributes are attributes whose values are embedded in the text and require proper text segmentation to be extracted. An example of an embedded attribute is BRAND, which will typically be mentioned in the text explicitly (e.g. "Nike running shoes", where Nike is a brand).

Derived attributes, on the other hand, are attributes that can be semantically derived from text. For example, in the text "Sexy Lingerie", there is no explicit mention of gender, but the GENDER attribute value can be derived based on the knowledge of the token affinity to MALE/FEMALE values. In general, the judgment used to determine the values for derived attributes is not as straightforward as in this example.

One approach for performing attribute extraction is referred to herein as the "regular expression approach". In the regular expression approach, a value dictionary is created for each category/attribute combination. A value dictionary for a category/attribute combination contains entries that correspond to possible values of the attribute for items that belong to that category. For example, one value dictionary may be created for apparel/brands. An apparel/brand dictionary would contain entries that correspond to the brand names of apparel makers.

Within a value dictionary, each entry includes one or more terms or patterns. When the input text matches a term or pattern associated with an entry, the input text is presumed to have the attribute value associated with the entry. For example, an apparel/gender dictionary may include an entry for MALE and an entry for FEMALE. The terms associated with the male entry may include "boy", "man", "guy", "men", "men's" etc. The terms associated with the female entry may include "girl", "woman", "lady", "women", etc.

Once a value dictionary for a given category/attribute combination has been created, an automated attribute extractor may search input text that falls into the category associated with the dictionary to see if the input text matches the terms associated with any entry in the dictionary. If the automated attribute extractor finds a term from the dictionary within the input text, then the attribute value associated with the entry that contains the matched term may be presumed to be the value of that attribute for that text. For example, input text that includes the word "men" will be presumed to have the value MALE for the attribute GENDER. Similarly, input text that includes the word "women" will be presumed to have the value FEMALE for the attribute GENDER. As another example, if an apparel/brand dictionary has an entry for the brand name Nike, and an apparel advertisement includes the word Nike, then Nike may be presumed to be the brand of the apparel in the advertisement.

Unfortunately, under many circumstances the accuracy of the regular expression approach is low. For example, an advertisement for a sweater may mention colors other than the color of the sweater that is the subject of the advertisement. As a consequence, the advertisement may be erroneously identified with each of the mentioned colors. As another example, a perfume advertisement that includes the phrase "the scent men prefer" may be erroneously identified as a MALE product because of the presence of the word "men" within the advertisement.

Another approach for extracting attributes from input text is referred to herein as the "machine learning approach". The machine learning approach typically involves training a machine-learning mechanism to recognize attribute values within training text. Once trained, the machine-learning mechanism may then be used to recognize and extract the attribute values from input text. Unfortunately, for the machine learning approach to produce accurate results, the machine learning mechanism must be provided with large amounts of accurately-labeled data.

Producing accurately-labeled training data in the amounts needed to produce accurate attribute extraction may involve a prohibitively large amount of human labor. For example, to train a machine-learning mechanism to accurately extract SIZE values from product offerings, the machine-learning mechanism may have to be fed a large number of product offerings along with the correct SIZE values for those product offerings. Similarly, to train a machine-learning mechanism to accurately extract COLOR values from product offerings, the machine-learning mechanism may have to be fed a large number of product offerings along with the correct COLOR values from those product offerings. Thus, the training process must be repeated separately for every attribute that is to be extracted from input text.

Depending on the task and attribute at hand, these two techniques will vary significantly in their performance (measured by precision/recall), but there is also a clear differentiation between them with respect to cost. In many contexts, labeling the data in the manner required to use machine-learning approach would incur an unacceptably high cost. Therefore, the general tendency is to rely on the regular expression approach as a primary facilitator of extraction, for its time to production is very short and in many situations it tends to show reasonable performance. For example, in context of an online shopping service, the extraction of BRAND using regular expressions that in turn use a dictionary of brands for a given category, often yields acceptable levels of precision. However, the particular cases where regular expression extraction fails could be numerous and oftentimes disturbing for the users.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OverView

Techniques are described herein for reducing the false positive rate of regular expression extractions via a specific data representation and a machine learning method that can be trained at a much lower cost (much fewer labeled examples) than the full scale machine learning solution. Embodiments are described hereafter in which the attribute determinations made by the regular expression technique are represented as skeleton tokens. The skeleton tokens, along with accurate attribute determinations, are provided to a machine-learning mechanism to train the machine-learning mechanism. Once trained, the machine-learning mechanism is used to predict the accuracy of attribute determinations represented by skeleton tokens generated for not-yet-analyzed input text.

Training the Machine Learning Mechanism

Techniques are described hereafter for training a machine learning mechanism to identify "false positives" produced when the regular expression technique is used to extract attribute values from input text. Training the machine learning mechanism generally involves feeding into a machine learning mechanism (1) data that indicates the extractions made by applying the regular expression technique to input text, and (2) data that represents the "correct" extractions for the same input text. By feeding this information to the machine learning mechanism, the machine learning mechanism "learns" to predict whether determinations made by the regular expression technique are accurate.

Once the machine learning mechanism has been trained to make such predictions, determinations made by the regular expression technique may be "corrected" based on the predictions produced by the machine learning mechanism. Details of how a machine learning mechanism may be trained and used to predict the accuracy of the extractions made by regular expression technique shall be described hereafter in greater detail.

Generating Marked Token Sequences

Figure 1:
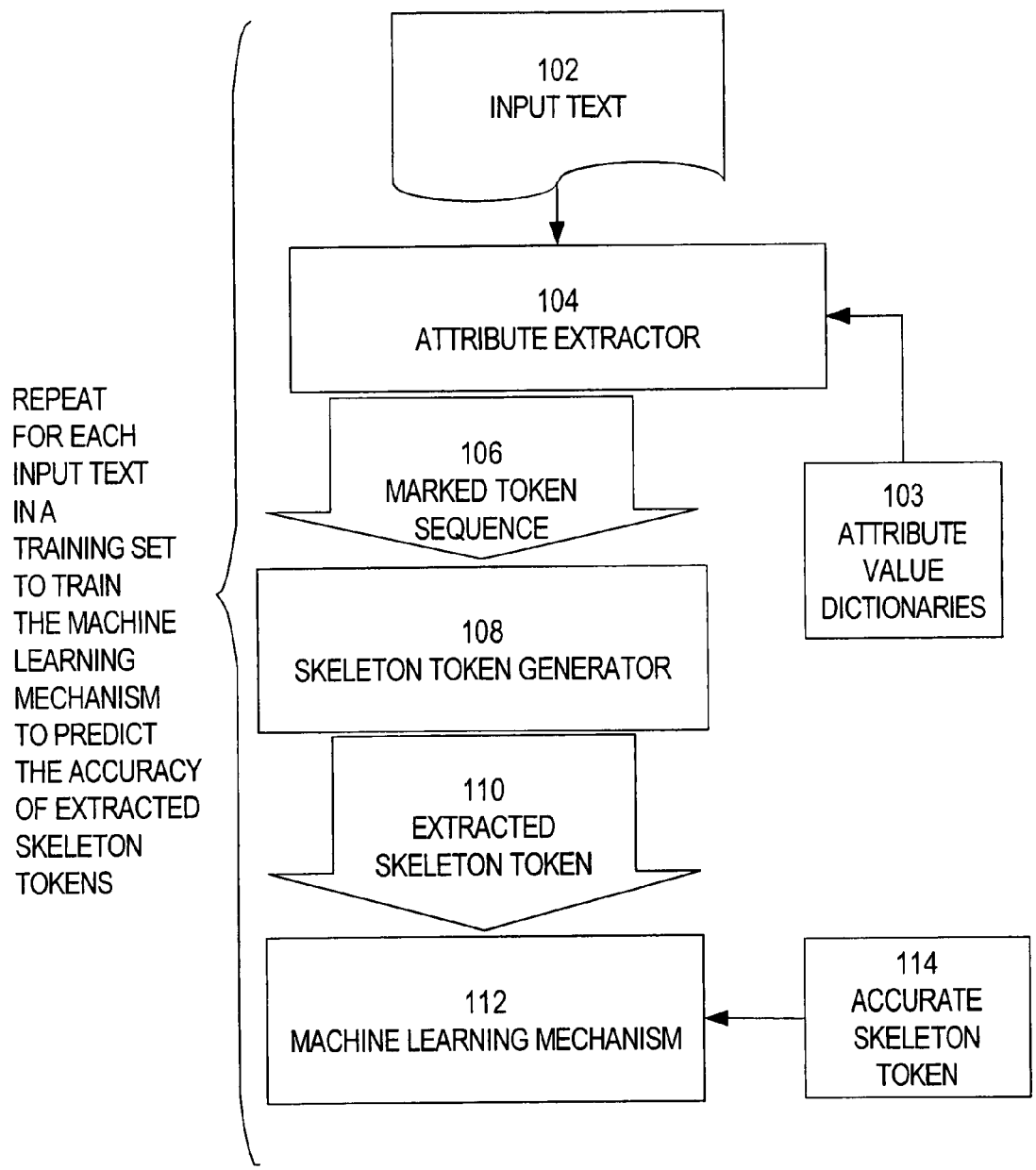
FIG. 1 is a block diagram of a system for training a machine-learning mechanism to evaluate skeleton tokens, according to an embodiment of the invention.

Referring to FIG. 1, it is a block diagram of a system for training a machine-learning mechanism 112, according to an embodiment of the invention. Unlike the machine-learning attribute extraction technique, the machine-learning mechanism 112 is not trained to extract attributes from input text. Rather, the machine-learning mechanism 112 is trained to predict the accuracy of characteristics that have been extracted from the input text using the regular expression technique.

Specifically, an attribute extractor 104 uses the regular expression technique to extract attributes from previously-analyzed input text 102 based on attribute value dictionaries 103. In one embodiment, attribute value dictionaries 103 are category-specific. For example, the SHOES category may have a BRAND attribute value dictionary, while the CARS category has an entirely different BRAND attribute value dictionary. In an embodiment that uses category-specific attribute value dictionaries, the appropriate category for input text 102 is first determined. The attribute extractor 104 then selects the appropriate attribute value dictionaries 103 based on the category of the input text 102. Once selected, the attribute value dictionaries 103 are used by attribute extractor 104 to extract attributes from the input text 102.

The result of the regular expression attribute extraction performed by attribute extractor 104 can be viewed as a sequence of text tokens, some of which are marked as being the values of some attributes. Such token sequences are referred to herein as "marked token sequences". For example, the input text "White Nike Shoes for everyday life" could cause the attribute extractor 104 to produce the marked token sequence: "<White, Color> <Nike, Brand> <Shoes, Type> for everyday <life, Brand>". This sequence of text tokens is represented in FIG. 1 as marked token sequence 106.

Generating Skeleton Tokens Based on Marked Token Sequences

Unlike the conventional regular expression technique, the system illustrated in FIG. 1 does not assume that the attribute value determinations made by attribute extractor 104 are correct. Instead, the marked token sequence 106 generated by attribute extractor 104 is fed into a skeleton token generator 108. The skeleton token generator 108 generates, based on the marked token sequence 106, data that concisely represents the attribute value determinations made by the attribute extractor. Such data is referred to herein as a "skeleton token".

In one embodiment, a skeleton token for a marked token sequence includes a single character for each token in the input text. In such an embodiment, the value of the character that corresponds to a token in the input text indicates which attribute, if any, the token was determined to be by attribute extractor 104. For example, if the first token in the input text 102 was determined to be the value of the BRAND attribute, then the first character of the skeleton token 110 may be B. If the second token in the input text 102 was determined to not be the value of any attribute, then the second character in the skeleton token 110 may be "t".

For the purpose of explanation, it shall be assumed that the input text is "White Nike Shoes for everyday life", and the marked token sequence 106 is "<White, Color> <Nike, Brand> <Shoes, Type> for everyday <life, Brand>". Under these circumstances, converting the marked token sequence 106 may produce the skeleton token CBTttB. Significantly, in this embodiment of the skeleton taken, none of the original input text is present.

In the skeleton token CBTttB, the C corresponds to the word "White", and indicates that attribute extractor 104 determined that "White" was the value for the attribute "Color". The first B in the skeleton token CBTttB corresponds to the word "Nike" and indicates that attribute extractor 104 determined that "Nike" was the value for the attribute "Brand". The T in the skeleton token CBTttB corresponds to the word "Shoes" and indicates that attribute extractor 104 determined that "Shoes" was the value for the attribute "Type". The two small "t"s correspond to "for" and "everyday" and indicate that "for" and "everyday" were not determined to correspond to any attribute. The final B in the skeleton token CBTttB corresponds to the word "life" and indicates that attribute extractor 104 determined that "life" was the value for the attribute "Brand".

Training the Machine Learning Mechanism

According to one embodiment, machine learning mechanism 112 is trained by feeding machine learning mechanism, for each input text in a training set, (1) a skeleton token produced by skeleton token generator 108, and (2) an accurate skeleton token 114. The accurate skeleton token 114 for an input text 102 is the skeleton token that would be produced for the input text 102 by an accurate attribute extraction process. Accurate skeleton tokens 114 may be generated, for example, based on attribute extraction determinations made by humans. Alternatively, accurate skeleton tokens 114 may be generated based on attribute extraction determinations made by an automated high-precision attribute extraction process that is too computationally intensive to be practical to use for all input text. The techniques described herein are not limited to any particular mechanism for generating the accurate skeleton tokens 114 used to train the machine learning mechanism.

For each input text in the training set, the machine learning mechanism 112 compares the extracted skeleton token 110 with the accurate skeleton token 114. As the machine learning mechanism 112 is fed these two sets of skeleton tokens, machine learning mechanism 112 learns which skeleton tokens generated by attribute extractor 104 are likely to be accurate, and which skeleton tokens are likely to include false positives. Further, machine learning mechanism 112 learns which attribute determinations, within any given skeleton token, are likely to be accurate, and which attribute determinations are likely to be false positives.

For example, the marked token sequence 106 of "<White, Color> <Nike, Brand> <Shoes, Type> for everyday <life, Brand>" produces the skeleton token CBTttB, which is fed to machine learning mechanism 112 as an extracted skeleton token 110. Significantly, the determination that "life" is a value for the BRAND attribute is an error. Thus, for the same input text, machine learning mechanism 112 if fed the accurate skeleton token CBTttt. Based on this input, the machine learning mechanism 112 learns that, when the extracted skeleton token is CBTttB, the attribute extraction represented by the final "B" is probably a false positive.

The training of machine learning mechanism 112 may be performed as an offline process. According to one embodiment, machine learning mechanism 112 is a conditional random field (CRF) model, which is an advanced sequential model in statistical learning. The CRF model's main goal is to take extracted skeleton tokens 110 produced by skeleton token generator 108 and output the classification labels for the tokens. CRF models can be trained successfully with small amounts of training data (e.g. <50 labeled offers) because of the limited vocabulary in which extracted skeleton tokens are represented, which reduces the number of parameters that require fitting used in CRFs.

The parameters of the CRF are usually referred to as "features" and can be arbitrary combinations of input tokens and the classes of certain tokens. For example, in one embodiment, in addition to the extracted skeleton token 110, machine learning mechanism 112 may be fed data that identifies (a) the identity of the previous token, (b) the class of the previous token and (c) the identity of the current token. Such input may improve the accuracy of decisions relating to the class of the current token. There typically exist many features like this, and their relative importance is decided upon during the training and is embedded in the produced model.

According to one embodiment, the training data is representative of the typical extraction cases. The CRF model uses modeling to establish the likelihoods of correctness of each of the extractions. The CRF model is extremely powerful and well suited for this task, although other models, such as mixtures of Markov models, can also be used with the techniques described herein.

Correcting Attribute Extraction Determinations

Figure 2:
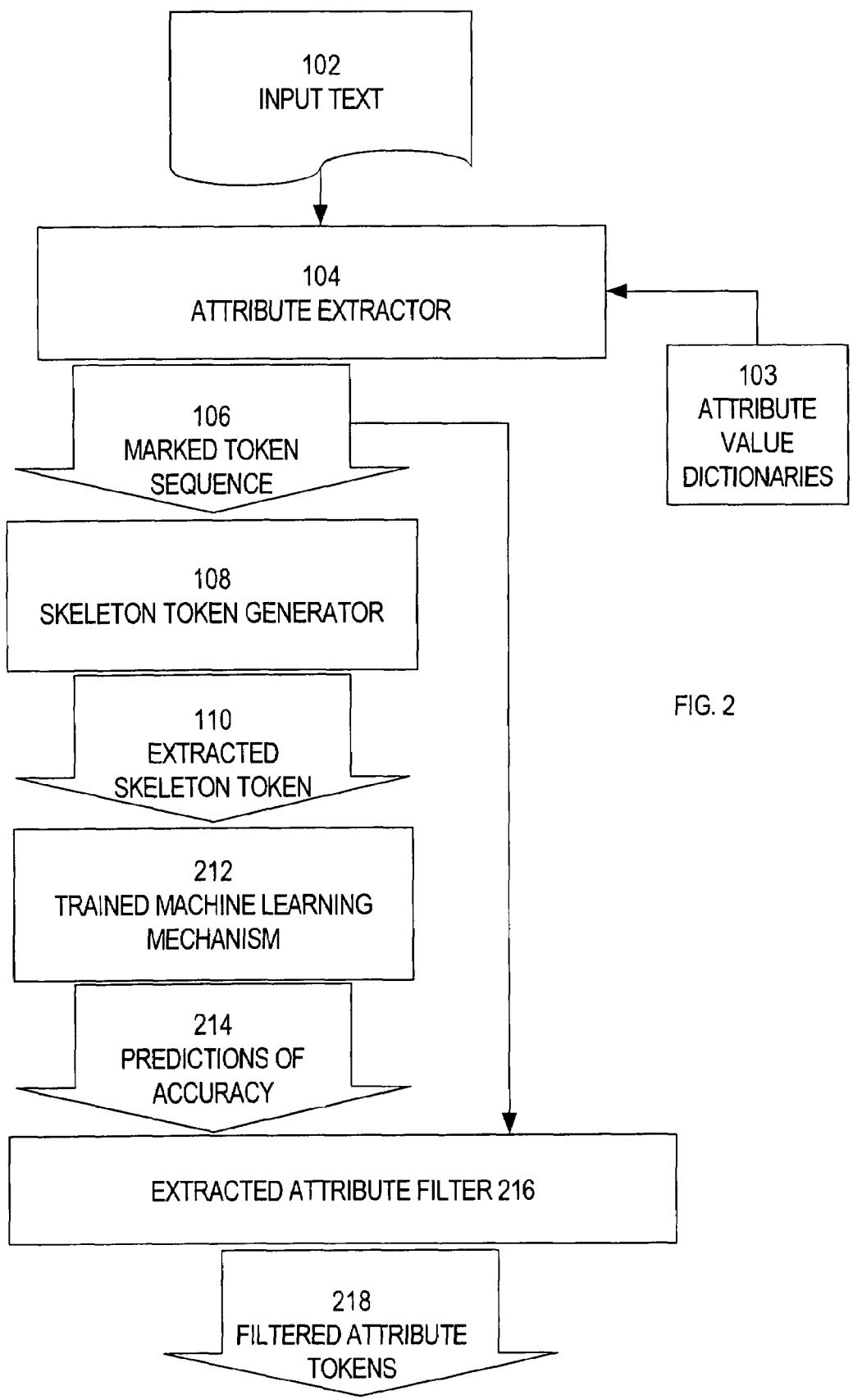
FIG. 2 is a block diagram of a system that uses a trained machine-learning mechanism to evaluate skeleton tokens to filter out "false positives" produced by regular expression techniques, according to an embodiment of the invention.

As mentioned above, machine learning mechanism 112 is trained to predict the likelihood that attribute extraction determinations made by attribute extractor 104 are correct. Referring to FIG. 2, it illustrates a system that generates filtered attribute tokens 218. Filtered attribute tokens 218 represent determinations, made by attribute extractor 104, that trained machine learning mechanism has predicted to be correct.

Even though attribute extractor 104 produced the marked token sequence "<White, Color> <Nike, Brand> <Shoes, Type> for everyday <life, Brand>" for the input text "White Nike Shoes for everyday life", trained machine learning mechanism 212 may have generated predictions of accuracy 214 that indicate that the <life, Brand> extraction is a false positive. Consequently, the filtered attribute tokens 218 may include only "<White, Color> <Nike, Brand> <Shoes, Type>".

In the embodiment illustrated in FIG. 2, the attribute extraction process proceeds as follows. Input text 102 is fed into attribute extractor 104. Attribute extractor 104 makes attribute extraction determinations based on attribute value dictionaries 103 using the regular expression technique. The marked token sequence 106 produced by attribute extractor 104 is fed to skeleton token generator 108 and extracted attribute filter 216.

Skeleton token generator 108 generates a skeleton token that reflects the attribute extraction determinations made by attribute extractor 104, and feeds the extracted skeleton token 110 to trained machine learning mechanism 212. Based on the extracted skeleton token 110 and the trained machine learning model, trained machine learning mechanism 212 generates predictions of accuracy 214.

Extracted attribute filter 216 receives the predictions of accuracy, and filters out of the marked token sequence 106 those attribute extraction determinations whose likelihood of correctness falls below a designated threshold. The results of this filtering are output as filtered attribute tokens 218.

Alternative Skeleton Token Representations

In the examples given above, skeleton tokens include one character for each token of the input text. However, this is merely one example of a skeleton token format that may be used to concisely represent the attribute extractions made by attribute extractor 104. The techniques described herein are not limited to any particular skeleton token format.

For example, in an alternative embodiment, skeleton tokens are further collapsed by representing any series of consecutive non-attribute tokens with a single character. Thus, when generating a skeleton token for the marked token sequence "<White, Color> <Nike, Brand> <Shoes, Type> for everyday <life, Brand>", "for" and "everyday" would be represented by a single token "t", resulting in the skeleton token CBTtB.

There are multiple variations on the representation that may be used for skeleton tokens. For example, one possible representation could retain some of the punctuation, the numerics or alphanumerics in the original text sequence if their presence were deemed important to ensure accuracy of the extraction verification process. Regardless of the specific representation used for skeleton tokens, skeleton tokens move away from the excessive text representation to a more manageable representation, primarily characterized as such when the number of unique tokens used is low, which makes the subsequent machine learning (ML) modeling more robust and effective.

Tokens that Match Multiple Attributes

Under some conditions, a single token within the input text may be identified as the value for multiple attributes. For example, assume that the token text is "Green shoe size twelve". Assume further that "Green" is brand of shoe. Under these assumptions, the token "Green" in the input text may be determined to be the value of both the COLOR attribute and the BRAND attribute of the input text.

According to one embodiment, tokens that match multiple attributes are handled by generating multiple marked token sequences, where one sequence is generated for each attribute to which the token matched. Thus, "Green shoe size twelve" may generate both (1)<Green, COLOR><shoe, TYPE><twelve, SIZE>, and (2)<Green, BRAND><shoe, TYPE><twelve, SIZE>.

Similarly, if the input text has multiple tokens that match multiple attributes, a marked token sequence is generated for each distinct combination of attribute extraction determinations. Thus, an input text with one token that matches two attributes, and another token that matches three attributes, would cause generation of six marked token sequences.

Extensions

The techniques described herein may be used in contexts other than the filtering of false positives produced by the regular expression technique. For example, the techniques can be used as a recommendation engine of candidates to be used in regular expressions in the future. For instance, the techniques can be used to mark high probability brand candidates, that may then go in for manual review, and once approved, will populate the brand dictionary used in future extractions.

Hardware Overview

Figure 3:
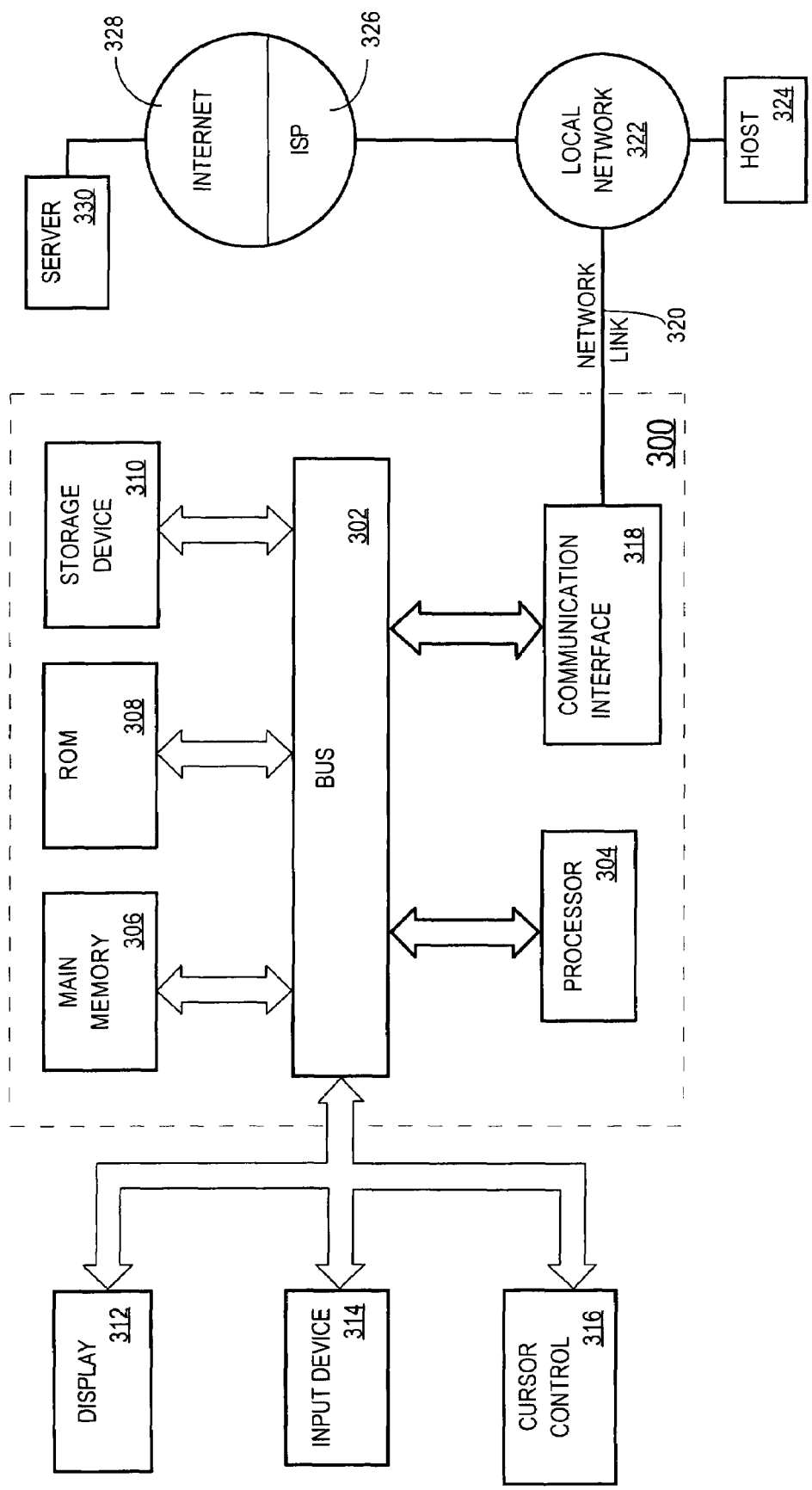
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   for each sequence of a plurality of attribute determination sequences in a training set, receiving a subset of attribute determinations in the attribute determination sequence that are likely to be a false positive;
   receiving input text, wherein at least a subset of tokens within the input text are a set of attribute tokens with corresponding attribute determinations;
   identifying at least one attribute determination corresponding to an attribute token of the set of attribute tokens as a false positive based on the training set;
   producing a set of filtered attribute tokens by filtering from said set of attribute tokens, all attribute tokens corresponding to attribute determinations that have been identified as false positives,
   wherein the method is performed by a computing device comprising a processor.

2. The method of claim 1, wherein identifying at least one attribute determination corresponding to an attribute token of the set of attribute tokens as a false positive comprises generating a skeleton token in which:
   each token within the input text is represented by a corresponding character; and
   the character that corresponds to a given token of the input text indicates which attribute, if any, the given token was determined to be.

3. The method of claim 1, wherein identifying at least one attribute determination corresponding to an attribute token of the set of attribute tokens as a false positive comprises generating a collapsed skeleton token in which each attribute token and each series of non-attribute tokens are represented with a corresponding single character.

4. The method of claim 2, wherein the skeleton token was generated using regular expression matching.

5. The method of claim 1, the method further comprises indexing the input text based on the filtered attribute tokens.

6. The method of claim 1, wherein identifying at least one attribute determination corresponding to an attribute token of the set of attribute tokens as a false positive comprises comparing an attribute determination sequence based on the set of attribute tokens to an attribute determination sequence in the training set.

7. The method of claim 1, wherein for each sequence of the plurality of attribute determination sequences in the training set, receiving the subset of attribute determinations in the attribute determination sequence that is likely to be a false positive comprises a machine learning mechanism receiving, for each input text in a training set of input texts:

first data that indicates attribute determinations made by an attribute extractor based on attribute value dictionaries; and second data that indicates accurate attribute determinations or false positive attribute determinations.

8. The method of claim 7, wherein the machine learning mechanism further receives, for each input text in a training set of input texts, information relating to a category.

9. The method of claim 7, wherein the machine learning mechanism uses a conditional random field model.

10. The method of claim 2, wherein the regular expression matching determines that a particular token of the input text corresponds to a plurality of attributes, further comprising:

generating a second plurality of attribute determination sequences, wherein each attribute sequence determination of the second plurality of attribute determination sequences has a different attribute of the plurality of attributes for the particular token of the input text;

identifying a subset of attribute determinations in each attribute determination sequence of the second plurality of attribute determination sequences that are likely to be a false positive.

11. A computer-readable medium, comprising volatile or non-volatile memory, carrying one or more sequences of instructions which, when executed by one or more processors, causes the one or more processors to perform steps comprising:

for each sequence of a plurality of attribute determination sequences in a training set, receiving a subset of attribute determinations in the attribute determination sequence that are likely to be a false positive;

receiving input text, wherein at least a subset of tokens within the input text are a set of attribute tokens with corresponding attribute determinations;

identifying at least one attribute determination corresponding to an attribute token of the set of attribute tokens as a false positive based on the training set;

producing a set of filtered attribute tokens by filtering from said set of attribute tokens, all attribute tokens corresponding to attribute determinations that have been identified as false positives.

12. The computer-readable medium of claim 11, wherein identifying at least one attribute determination corresponding to an attribute token of the set of attribute tokens as a false positive comprises generating a skeleton token in which:

each token within the input text is represented by a corresponding character; and the character that corresponds to a given token of the input text indicates which attribute, if any, the given token was determined to be.

13. The computer-readable medium of claim 11, wherein identifying at least one attribute determination corresponding to an attribute token of the set of attribute tokens as a false positive comprises generating a collapsed skeleton token in which each attribute token and each series of non-attribute tokens are represented with a corresponding single character.

14. The computer-readable medium of claim 12, wherein the skeleton token was generated using regular expression matching.

15. The computer-readable medium of claim 11, the steps further comprise indexing the input text based on the filtered attribute tokens.

16. The computer-readable medium of claim 11, wherein identifying at least one attribute determination corresponding to an attribute token of the set of attribute tokens as a false positive comprises comparing an attribute determination sequence based on the set of attribute tokens to an attribute determination sequence in the training set.

17. The computer-readable medium of claim 11, wherein for each sequence of the plurality of attribute determination sequences in the training set, identifying the subset of attribute determinations in the attribute determination sequence that is likely to be a false positive comprises a machine learning mechanism receiving, for each input text in a training set of input texts:

first data that indicates attribute determinations made by an attribute extractor based on attribute value dictionaries; and second data that indicates accurate attribute determinations or false positive attribute determinations.

18. The computer-readable medium of claim 17, wherein machine learning mechanism further receives, for each input text in a training set of input texts, information relating to a category.

19. The computer-readable medium of claim 17, wherein the machine learning mechanism uses a conditional random field model.

20. The computer-readable medium of claim 12, wherein the regular expression matching determines that a particular token of the input text corresponds to a plurality of attributes, further comprising:

generating a second plurality of attribute determination sequences, wherein each attribute sequence determination of the second plurality of attribute determination sequences has a different attribute of the plurality of attributes for the particular token of the input text;

identifying a subset of attribute determinations in each attribute determination sequence of the second plurality of attribute determination sequences that are likely to be a false positive.

* * * * *